United States Patent [19]

Dennany, Jr. et al.

[11] Patent Number: 4,875,715
[45] Date of Patent: Oct. 24, 1989

[54] QUICK CONNECT CONNECTOR

[75] Inventors: Robert D. Dennany, Jr., Lapeer; Duane J. Pontbriand, Rochester, both of Mich.

[73] Assignee: ITT Corporation, New York, N.Y.

[21] Appl. No.: 185,012

[22] Filed: Apr. 22, 1988

[51] Int. Cl.$^4$ ............................................. F16L 55/00
[52] U.S. Cl. ...................... 285/87; 285/315; 285/322; 285/110; 285/379; 285/924; 285/93; 29/428
[58] Field of Search .............. 285/315, 316, 319, 320, 285/924, 322, 323, 87, 110, 93; 29/428

[56] References Cited

U.S. PATENT DOCUMENTS

| 3,569,903 | 3/1971 | Brishka | 339/74 |
|---|---|---|---|
| 3,691,943 | 9/1987 | DeLand et al. | 285/315 |
| 3,888,523 | 6/1975 | Bartholomew | 285/382 |
| 3,997,195 | 12/1976 | Bartholomew | 285/81 |
| 4,021,062 | 5/1977 | Mariaulle | 285/39 |
| 4,035,005 | 7/1977 | DeVincent et al. | 285/319 |
| 4,161,061 | 7/1979 | Mason et al. | 29/566.4 |
| 4,310,185 | 1/1982 | Bartholomew | 285/369 |
| 4,398,757 | 8/1983 | Floyd | 285/315 |
| 4,423,392 | 1/1984 | Bartholomew | 285/319 |
| 4,508,234 | 4/1985 | Bartholomew | 215/206 |
| 4,508,369 | 4/1985 | Mode | 285/39 |
| 4,524,995 | 6/1985 | Bartholomew | 285/54 |
| 4,526,411 | 7/1985 | Bartholomew | 285/305 |
| 4,541,658 | 9/1985 | Bartholomew | 285/319 |
| 4,601,497 | 7/1986 | Bartholomew | 285/319 |
| 4,624,483 | 11/1986 | Stomberg | 285/315 X |
| 4,630,848 | 12/1986 | Twist et al. | 285/308 |
| 4,647,082 | 3/1987 | Fournier et al. | 285/315 |
| 4,711,472 | 12/1987 | Schnell | 285/162 |

FOREIGN PATENT DOCUMENTS 1314816 4/1973 United Kingdom ................ 285/315

Primary Examiner—Dave W. Arola
Attorney, Agent, or Firm—Robert P. Seitter

[57] ABSTRACT

A quick connect connector is disclosed. The connector includes a connector housing having a first and a second ends. A first chamber is provided in the housing between the first and the second ends for receiving a sealing member therein. A retaining collar is slidably mounted on the housing between the first and second ends of the housing and includes at least one radially deflectable locking portion thereon. The radially deflectable retaining portion is adapted to engagingly contact a flange portion of a tubing member inserted in the housing to retain the tubing member in a locked position relative to and sealingly engaging the sealing member between the retaining portion and the first end of the housing. The locking portion is received within a groove of the housing to lock the collar to the housing and secure the connection. The tubing connector is resiliently urged out from the housing and against the engaged retaining portion of the housing.

15 Claims, 3 Drawing Sheets

QUICK CONNECT CONNECTOR

BACKGROUND OF THE INVENTION

This invention relates to a connector assembly for terminating a connection such as for completing the connection between the confronting ends of tubing conduits. More particularly, this invention relates to such a quick connector for providing a quick connection while providing positive feedback to the operator that an effective connection has been accomplished.

Connectors for connecting tubing sections and tubular conduits are known and have been widely used in the art. These connectors are utilized in the automotive industry, as well as many other industries, to provide low-cost, reliable and easy to assemble systems. These connectors are typically utilized to provide fluid carrying conduits in fuel and refrigerant lines. These connectors have the disadvantages that a relatively large number of connector components are required and substantial assembly time is required in screwing the assembly fittings and tightening the devices to provide the proper torque to accomplish the desired fluid seal. Further, these systems have the disadvantage that the operator initially connecting the connector or in a subsequent field servicing operation, is not provided with a positive indication that a connection or re-connection has been effected. A further disadvantage is that these systems typically utilize substantial pressure levels, which in many applications are on the order of 45 p.s.i., which can result in the undesired diversion of a substantial amount of the fluid in the event that an improper connection has been made. This is a problem.

These and other disadvantages are overcome by the present invention wherein a connector is provided for connecting tubing sections and the like while providing an indication to the operator that a proper connection has been effected. The connector in accordance with the present invention provides a connection which is either locked and sealed or unlocked with no sealing taking place. That is, any intermediate position which results in an only partially sealed connection is avoided. Another feature of the present invention is that the relative alignment of the confronting connector ends is maintained to avoid undesired spraying of the pressurized fluid around the vehicle and the operator in the event that an improper connection has been effected.

SUMMARY OF THE INVENTION

Briefly, a quick connector is provided. The connector comprises a connector housing having first and second ends and a radially deflectable retaining portion. A first chamber is provided in the housing between the first and second ends for receiving a sealing member therein. A retaining collar is slidably mounted on the housing between the first and second ends of the housing and wherein the collar includes at least one radially deflectable locking portion thereon. The radially deflectable retaining portion of the housing is adapted to engage a flange portion of a connection member such as a tube inserted in the housing to retain the connection member in locked position relative to and in sealing engagement with the sealing member between the retaining portion and the first end of the housing. The locking portion is adapted to engage a receiving portion of the housing to lock the collar relative to the housing. Means are provided for resiliently urging the member out from the housing and against the engaged retaining portion.

In accordance with another important feature of the present invention, means are provided for maintaining the relative axial alignment of the confronting connecting ends of the fluid connection to avoid undesired spraying of the pressurized fluid around the vehicle and the operator. Further, means are provided for ensuring that the final connecting operation is clearly demarked between two stable transition states separated by a point of unstable equilibrium which thereby assures the operator that the connection has or has not been properly performed when a first stable state is reached. Conversely, the second stable state signals the operator that a proper connection has not been effected.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
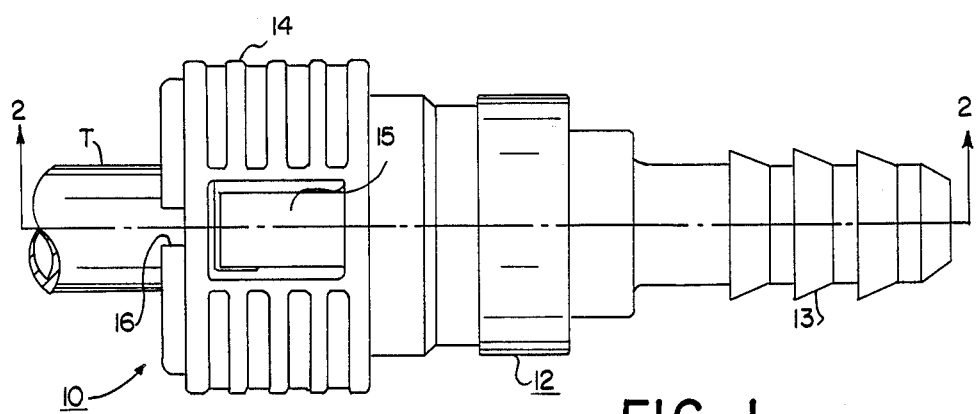
FIG. 1 is a plan view of the quick connector connector in accordance with the principles of the present invention.

Referring now to FIG. 1 there is shown generally at 10 a quick connect connector assembly in accordance with the present invention. Quick connect connector assembly 10 includes a housing 12 having a first end 13 which is illustrated in FIG. 1 as a ramp or barbed end portion suitable for connection to a flexible tubing or rubber hose (not shown). It will also be appreciated by those skilled in the art that the first end of housing 12 can be terminated to any suitable device such as another back-to-back connector assembly 10, a fixed block mounting, or any other suitable termination device. The second or other end of housing 12 is adapted to accept a tubing section T which is inserted through a longitudinally extending coaxial opening within housing 12. Once tubing section T is inserted within housing 12, the connection is completed by translating a lock sleeve or retaining collar 14 towards the second end of housing 12 wherein the radially inwardly deflectable portions of a plurality of fingers 15 of collar 14 engage corresponding portions of an annular and circumferentially extending groove in housing portion 12 as will be explained more fully hereinafter. The radially inwardly deflectable portions of fingers 15 also span a plurality of slots 16 of housing 12 which in the preferred embodiment of the present invention comprise four slots in the generally tubular body configuration of housing 12. Slots 16 are spaced 90 degrees apart along the extending tubular rearward end portion of housing 12.

Figure 2:
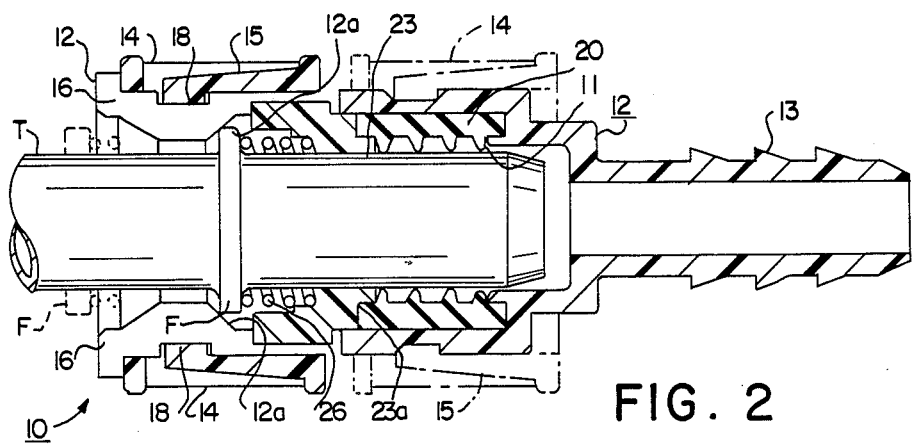
FIG. 2 is a cross-sectional view of the connector of FIG. 1 taken along the line 2—2 thereof.

Referring now to FIG. 2 there is shown a cross-sectional view taking along the lines 2—2 of FIG. 1 and which illustrates, more particularly, the alternative positions of collar 14 as depicted in the dotted, and cross-sectional views of collar 14 in FIG. 2. It can be seen by reference to FIG. 2 that two slots 16 are illustrated therein and wherein retaining projections 15 are received within circumferentially extending annular groove 18 of housing 12. Connector 10 further includes a resilient annular sealing member 20 which includes a plurality of radially inwardly extending ribs 22 which sealingly engage the outer surface of tubing T once tubing T is properly inserted within housing 12. The details and function of sealing member 20 are more fully set forth in the co-pending application Ser. No. 175,005, of R. D. Dennany, Jr. entitled " Quick Connector Assembly" , filed on Mar. 30, 1988, and which is assigned to the same assignee as the present invention. Further details of sealing member 20 may be had by reference to the co-pending application, the disclosure of which is incorporated herein by reference as if fully set forth herein. Quick connector 10 further includes a seal retainer or cap 24 which, in turn, receives means for resiliently urging the subsequently inserted tubing section T outwardly of housing 12 and against retaining portion of housing 12 as will be explained more fully hereinafter. Housing 12 includes an axially inwardly projecting ring portion 11 which is inserted into sealing member 20 to further complete the desired sealing as described in the noted co-pending application. Cap 24 similarly includes a axially inwardly but oppositely facing projection portion 23 which projects into and step 23a compressively loads sealing member 20 within the surrounding chamber of housing 12. Cap 24 receives a resilient member or spring 26 which is retained within a central cavity of cap 24 and which engages an upset or flange F of tubing section T when tubing section T is inserted within housing 12. Because of the longitudinal slots 16 of housing 12, the respective quarter sections thereof are resiliently deflectable toward and away from the central axis of housing 12. Once collar 14 is translated towards the second end or left-hand portion of connector 10, as illustrated in FIGS. 1 and 2, radially inwardly facing portions 12a of the respective quarter sections of housing 12 are deflected toward and into engagement with tubing section T wherein surfaces 15a engage the rearward facing portion of flange F to retain tubing section T within housing 12 and the completed connector 10. At this time the resilient fingers 15 of collar 14 snap into the respective portions of groove 18 to retain collar 14 in a fixed, locked and connection-completed position on housing 12.

If the connection of connector 10 is not properly completed, means are provided to provide a visual and sensorial touch feedback to the operator. That is, if portions 12a do not engage the outwardly facing side of flange F of tubing T and fingers 18 are not in snapped into groove 18, spring 26 will resiliently urge and eject tubing section T outwardly of housing 10, wherein flange F and the outer end of spring 26 take the positions indicated by dotted lines in FIG. 2.

Figure 3:
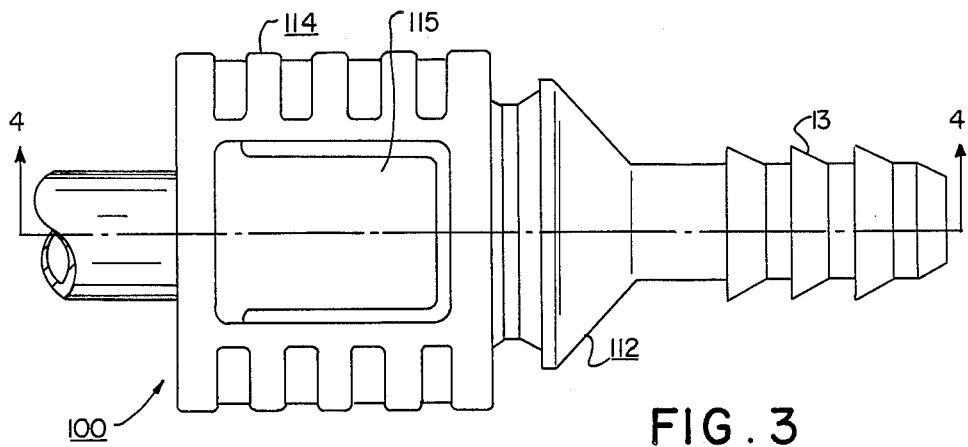
FIG. 3 is a plan view of a quick connect connector in accordance with a preferred alternative embodiment in accordance with the present invention.
Figure 4:
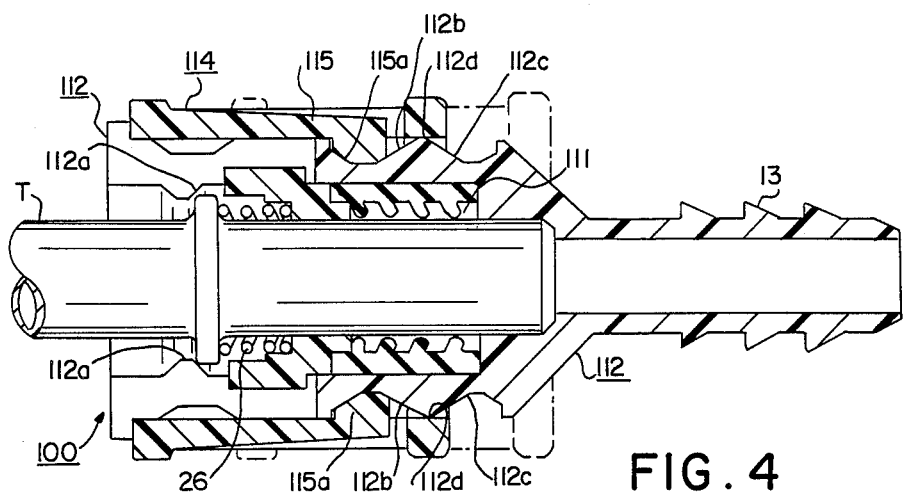
FIG. 4 is a cross-sectional view taken along the line 4—4 of FIG. 3 and which further illustrates a bistable insertion feature in accordance with a further feature of the present invention.

Referring now to FIGS. 3 and 4 there are shown plan and cross-sectional views of an alternative embodiment of the quick connect connector in accordance with the present invention. In FIGS. 3 and 4, like elements bear like reference numerals. However, the overall connector is shown generally at 100 to indicate the modifications thereof. It can be seen that connector 100 includes a collar 114 which is translatable between the first and second ends of connector 100 which includes deflectable finger portions 115 which are mounted to collar 114 but which are directed in a longitudinal direction which is opposite of that of deflectable portions 15 of connector 10 of FIGS. 1 and 2. Referring now to FIG. 4 it can be seen that housing 112 includes engaging portions 112a similar to 12a of FIG. 2. Housing 112 of FIG. 4 further includes first and second ramp portions 112b and 112c which separate a point of unstable equilibrium 112b wherein the radially inwardly deflectable portions 115a of deflectable fingers 115 reside in one of the stable portions provided by portions 112b and 112c rather than dwelling at the intermediate point 112d. That is, once collar 115 is translated in either longitudinal direction of housing 112, fingers 115 will assume one of the two positions depicted by portions 112b and 112c without assuming an intermediate as indicated at point 112d. This has the advantage that it signals the operator that the collar has been sufficiently translated to complete the connection or that the collar has not been translated in the connection making direction at all.

Figure 5A:
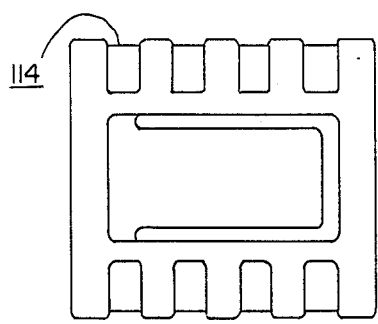
FIGS. 5a–5c are plan end and cross-sectional views of a retaining collar suitable for use in the embodiment illustrated in FIGS. 3 and 4.
Figure 5B:
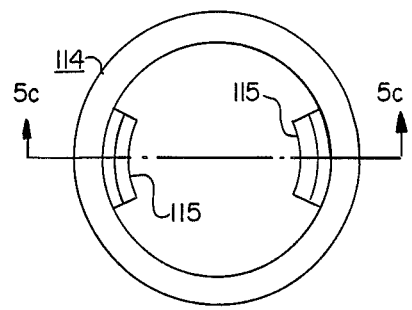
Figure 5C:
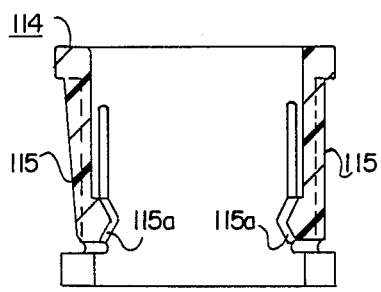

Referring now to FIGS. 5a–5c, there are shown plan, end and cross-sectional views of collar 114 of FIGS. 3 and 4. It can be seen that deflecting portions 115a of fingers 115 are directed radially inwardly with respect to the axis of collar 114 which coincides with and is coaxial with the axis of housing 112.

Figure 6A:
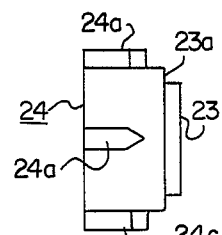
FIGS. 6a–6c illustrate plan, end and cross-sectional views of the retaining seal or cap in accordance with the present invention which is utilized to retain the resilient means which urges the associated tubing connector outwardly of the connector housing and in engagement with and against the deflectable retaining means integrally provided with the housing; and, FIG. 7 illustrates a partial cross-sectional view of a portion of the connector of FIG. 4 illustrating a means for retaining the unconnected or improperly advanced tubing within the housing in accordance with a further feature of the present invention.
Figure 6B:
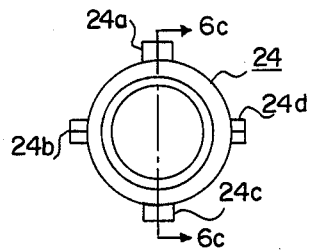
Figure 6C:
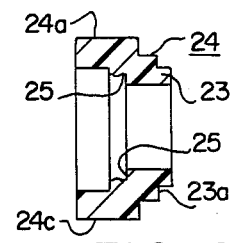

Referring now to FIGS. 6a–6c there are shown plan, end and cross-sectional views of the seal retainer or cap 24 of the previous drawing figures. It can be seen that cap 24 includes four tabs 24a–24d which are respectively received within the four longitudinal slots 16 and 116 of quick connector housings 12 and 112 of the previous drawing figures. Cap 24 includes an undercut portion 25 which functions as a holder for the cylindrical bottom of spring 26.

The operation and further details of the connector in accordance with the principles of the present invention are described as follows: The connector is provided to the user with the collar in the retracted position as illustrated in dotted lines in FIGS. 2 and 4. The connector is then installed onto a connection member such as a male tube. The upset or flange on the tube compresses the spring and collar then can be moved into the assembled position as illustrated by the solid, cross-sectional position in FIGS. 2 and 4. If the collar is not moved into its assembled position, the tube will be ejected out of the connector. If the upset or flange of the tube is only partially inserted, the expanded, deflectable portions of the housing will preclude movement of the collar into its assembled position. On the other hand, if the collar is in its assembled position prior to insertion of the tube, the tube cannot penetrate into the housing and seal as the flexible retaining fingers of the housing will block the tube. To disassemble a properly connected connector from the male tube, the operator rotates the collar until the collar engages a cam member stop allowing the collar to be moved back to its disassembled position. This, then, causes the spring to eject the tube outward causing a disconnection.

In a preferred embodiment of the quick connect connector in accordance with the present invention, the resiliency or spring constant of spring 26 is selected to ensure that the connection member or tube is ejected when an incomplete connection has been made or when the connector is disassembled. In this regard the resiliency, length and spring constant is selected to overcome the removal drag of the seal member within the housing and the drag of removal introduced by the deflectable retaining members of the housing.

Figure 7:
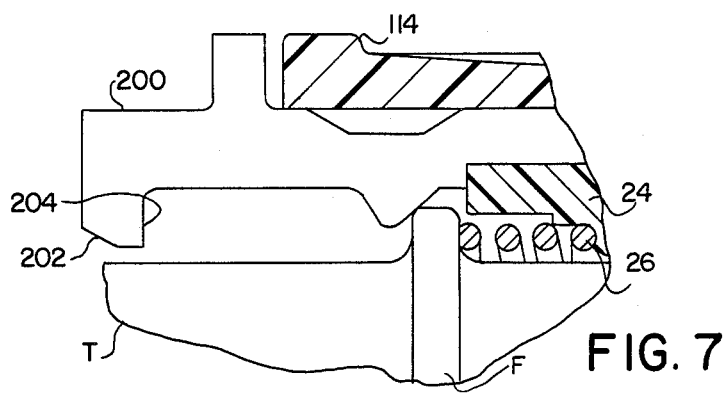

Referring now to FIG. 7 there is shown an alternative embodiment of the quick connect connector of the previous drawing figures. It can be seen that housing 112 includes an extension 200 which includes a radially inwardly directed extension 202 which provides an axially inwardly facing stop surface 204 which is adapted to confront and engage flange F of tubing section T when tubing section T is removed from housing 12 such as by the spring ejection which could occur when the connector is improperly installed. This then provides the means for maintaining the relative coaxial alignment of the confronting ends of the tubing connectors thereby to avoid an undesired excessive spraying of the pressurized fluid or refrigerant around the vehicle or the operator when the connection is improperly made.

The material of the connector in accordance with the present invention is preferably a plastic material such as Nylon. Of course, the material may also comprise a metallic or elastomeric material or any other suitable material. Similarly, the connection member such as a tube may comprise any suitable material and in any desired geometrical configuration.

What has been taught, then, is a quick connect connector facilitating, notably, fast and reliable connections of fuel systems at automobile assembly plants and service centers. The invention also provides quick disassembly for service of the fuel assemblies and components, and which overcomes the disadvantages of the prior art. The form of the inventions illustrated and described herein are but preferred embodiments of these teachings. They are shown as illustrations of the inventive concepts, however, rather than by way of limitation, and it is pointed out that various modifications and alterations may be indulged in within the scope of the appended claims.

What is claimed is:

1. A quick connect connector comprising, in combination:
    a connector housing having a first and second ends and a receiving portion fixedly provided therein, said housing having a fixedly mounted and radially deflectable retaining portion thereon;
    a first chamber in said housing between said first and second ends and a sealing member therein;
    a retaining collar slidably mounted on said housing between said first and second ends of said housing, said collar having at least one fixedly mounted and radially deflectable locking portion thereon;
    said radially deflectable retaining portion being adapted to engagingly contact a flange portion on a connection member inserted in said housing when said retaining portion is deflected to retain said connection member in locked position relative to and in sealing engagement with said sealing member between said retaining portion and said first end of said housing;
    said radially deflectable locking portion being received within and adapted to engage said receiving portion fixedly provided in said housing to lock said collar relative to said housing when said collar is moved into a corresponding position wherein said collar maintains said retaining portion in engagement with the member to prevent removal of the member from said connector housing when said collar is locked at said corresponding position; and,
    means for resiliently urging the member outwardly of said housing and the flange against said engaged retaining portion.

2. The quick connect connector according to claim 1, wherein said housing is a generally tubular member having a plurality of longitudinallly extending slots extending parallel to an axis of said housing.

3. The quick connector according to claim 2 wherein said slots separate portions of said housing and which provide radially deflectable portions for engaging the connection member.

4. The quick connect connector according to claim 2, including a seal retainer in said housing adjacent said first chamber between said first chamber and said second end of said housing for retaining said sealing member in said housing.

5. The quick connect connector in accordance with claim 4, wherein said means for resiliently urging the connection member outwardly of said housing and against said retaining portion comprises a spring.

6. The quick connect connector according to claim 3, wherein said seal retainer has a cavity therein terminating in a bottom portion and wherein said spring is disposed between the flange portion of the connection member and the bottom of said cavity within said seal retainer.

7. The quick connector according to claim 1, wherein said housing includes first and second ramp portions separating first and said retaining portions which alternatively receive said radially deflectable locking portion of said collar.

8. The quick connector according to claim 7 wherein said first and second ramp portion is are separated by an intermediate portion which resists the stable positioning of said radially deflectable locking portion of said collar thereby to urge said deflectable locking portion toward one of said first and second retaining portions of said housing.

9. The quick connector according to claim 1, wherein said housing includes means for capturing the connection member in relative alignment with said housing wherein the connection member is at least partially removed from said housing.

10. The quick connector according to claim 9, wherein said means for capturing includes a stop member extending into said housing for engaging the flange portion of said at least partially removed connection member.

11. A method for providing a fluid connection comprising the steps of:
    providing a connector housing having a first and second ends and a receiving portion fixedly provided therein, said housing having a fixedly mounted and radially deflectable retaining portion thereon;

providing a first chamber in said housing between said first and second ends and a sealing member therein;

slidably mounting a retaining collar on said housing between said first and second ends of said housing, said collar having at least one fixedly mounted and radially deflectable locking portion thereon providing a connection member having a flange portion thereon;

engaging said radially deflectable retaining portion with said flange portion on said connection member inserted in said housing when said retaining portion is deflected to retain said connection member in locked position relative to and in sealing engagement with said sealing member between said retaining portion and said first end of said housing;

engaging said radially deflectable locking portion with said receiving portion fixedly provided in said housing to receive said locking portion to lock said collar relative to said housing when said collar is moved into a corresponding position wherein said collar maintains said retaining portion in engagement with said member to prevent removal of said member to prevent removal of said member from said connector housing when said collar is locked at said corresponding position; and, resiliently urging said member outwardly of said housing and against said engaged retaining portion.

12. The method according to claim 11, wherein said step of providing a housing includes the step of providing a generally tubular member having a plurality of longitudinally extending slots extending parallel to an axis of said housing.

13. A quick connect connector comprising, in combination:

a generally tubular connector housing having a first and second ends and a receiving portion fixedly provided therein, said housing having at least one longitudinally extending slot therein cooperating with an adjacent fixedly mounted and radially deflectable retaining portion of said housing thereon;

a first chamber in said housing between said first and second ends and a sealing member therein;

a retaining collar slidably mounted on said housing between said first and second ends of said housing, said collar having at least one fixedly mounted and radially deflectable locking portion thereon;

said radially deflectable retaining portion being adapted to engagingly contact a flange portion on a connection member inserted in said housing when said retaining portion is deflected to retain the connection member in locked position relative to and in sealing engagement with said sealing member between said retaining portion and said first end of said housing;

said radially deflectable locking portion being received within and adapted to engage said receiving portion fixedly provided in said housing to lock said collar relative to said housing when said collar is moved into a corresponding position wherein said collar maintains said retaining portion in engagement with the member to prevent removal of the member from said connector housing when said collar is locked at said corresponding position; and, means for resiliently urging the member in the direction outwardly of said housing and the flange against said engaged retaining portion.

14. The connector according to claim 1, wherein said means for resiliently urging the member is a spring means whose spring force is greater than the removal drag of the connection member and said deflectable retaining portion, which removal drag resists the removal of the connection member from said housing.

15. The connector according to claim 14, wherein said spring means is a coil spring.

* * * * *